Nov. 19, 1940.　　　W. FERRIS　　　2,222,144

AUTOMOTIVE DRIVE

Filed April 10, 1939　　　4 Sheets-Sheet 1

INVENTOR.
WALTER FERRIS
BY Wesley Merrill
ATTORNEY.

Nov. 19, 1940.    W. FERRIS    2,222,144
AUTOMOTIVE DRIVE
Filed April 10, 1939    4 Sheets-Sheet 2

INVENTOR.
WALTER FERRIS
BY Wesley P. Merrill
ATTORNEY.

Nov. 19, 1940.   W. FERRIS   2,222,144
AUTOMOTIVE DRIVE
Filed April 10, 1939   4 Sheets-Sheet 3
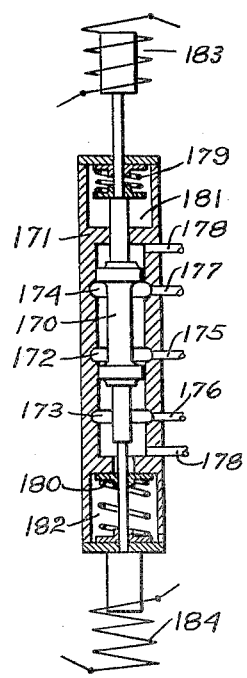
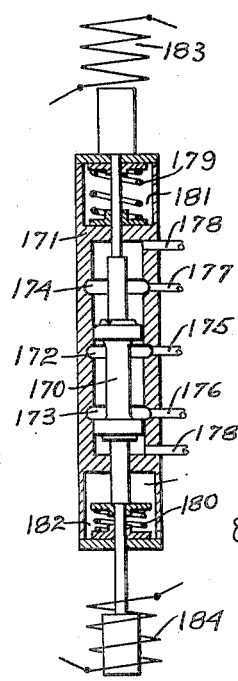
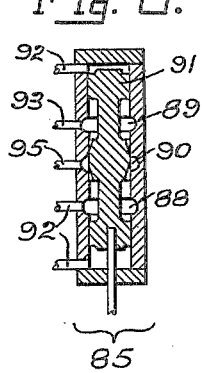
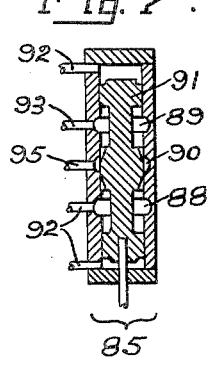
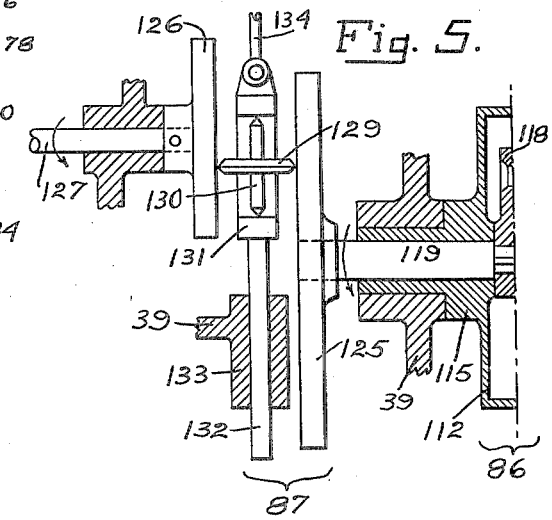
INVENTOR.
WALTER FERRIS
BY Wesley P. Merrill
ATTORNEY.

Nov. 19, 1940.  W. FERRIS  2,222,144
AUTOMOTIVE DRIVE
Filed April 10, 1939  4 Sheets—Sheet 4
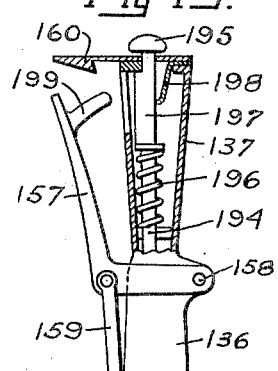
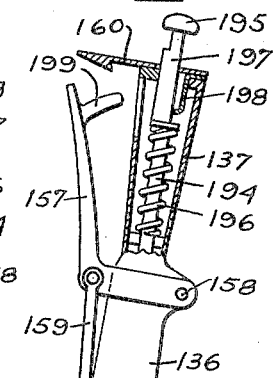
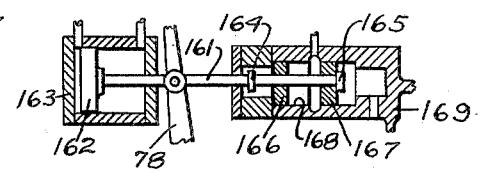
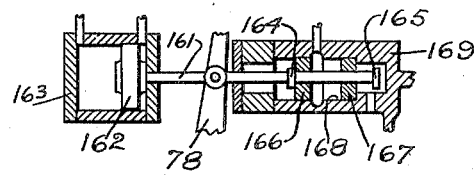
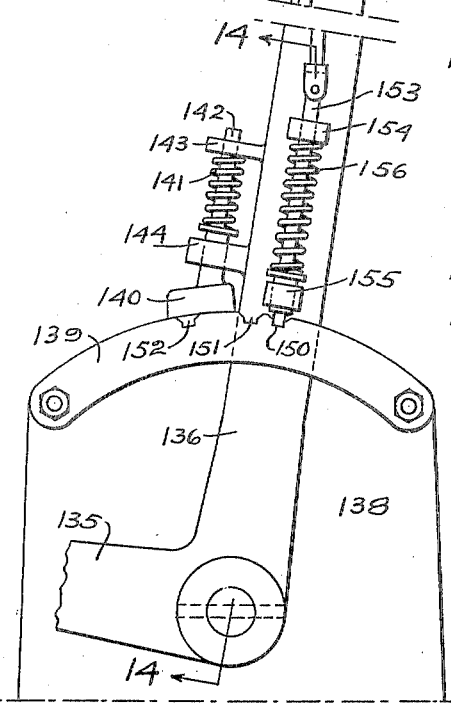
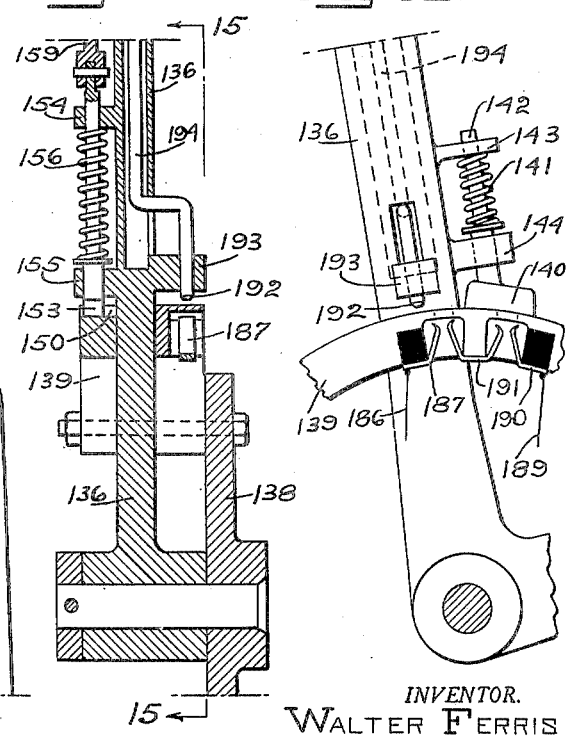
INVENTOR.
WALTER FERRIS
BY
ATTORNEY.

UNITED STATES PATENT OFFICE 2,222,144

AUTOMOTIVE DRIVE

Walter Ferris, Milwaukee, Wis., assignor to The Oilgear Company, Milwaukee, Wis., a corporation of Wisconsin Application April 10, 1939, Serial No. 267,191

12 Claims. (Cl. 74—189.5)

This invention relates to drives of the type which enables a prime mover to rotate a driven member at variable speeds, and it is particularly adapted for transmitting motion from the engine of an automotive vehicle to the driving wheels thereof. For the purpose of illustration, the invention will be explained as applied to an automotive vehicle, such as a truck or passenger bus, but it is to be understood that the invention is not limited to such use.

Automotive vehicles are ordinarily provided with a mechanical transmission comprising a plurality of gear trains of different ratios which may be selectively engaged to enable the vehicle engine to drive the rear wheels at different speeds relative to the engine speed and which may be disengaged to permit the engine to run without driving the wheels. Such a transmission is ordinarily connected to the engine through a clutch which may be disengaged to permit the gears to be shifted and thereby vary the speed of the wheels relative to the speed of the engine, the speed ratio being varied in definite steps as determined by the ratio of the gears.

In order to obtain a stepless variation in speed ratios, it has heretofore been proposed to replace the mechanical transmission of an automotive vehicle with a hydraulic transmission consisting primarily of a pump to be driven by the engine and a motor to be energized by the pump and drive the wheels. However, in order to transmit enough power from the engine to the wheels under extreme load conditions, a hydraulic transmission would necessarily be so large and heavy that such an arrangement would not ordinarily be practical.

The present invention has as an object to provide a drive which includes a mechanical transmission for transmitting power from a prime mover to a shaft, a hydraulic transmission arranged in parallel with the mechanical transmission and including a pump driven by the prime mover and a motor energized by the pump and connected to the shaft to drive the same, and means for simultaneously rendering the one transmission effective and the other transmission ineffective to transmit power from the prime mover to the shaft.

Another object is to provide a drive of the above character with means responsive to a variation in the relative speeds of the prime mover and the shaft for varying the relative displacements of the pump and the motor to thereby cause the motor to drive the shaft at a speed having a predetermined ratio to the speed of the prime mover.

Other objects and advantages will appear in the following description of the drive shown schematically in accompanying drawings in which the views are as follows:

Fig. 4 is a section taken on line 4—4 of Fig. 1 but drawn to a larger scale and showing a differential which forms a part of a control mechanism.

Fig. 5 is a detail view showing a friction disk transmission which has one disk thereof connected to one leg of the differential shown in Fig. 4.

Figs. 6 and 7 are views showing different positions of a pilot valve which controls pump displacement and is operated by the differential shown in Fig. 4.

Figs. 8 and 9 are views showing different positions of a control valve which controls the operation of the apparatus shown in Figs. 10 and 11.

Figs. 10 and 11 are views showing different positions of the pistons of a hydraulic device which is adapted to control the mechanical transmission.

Fig. 12 is an elevation of a control lever for adjusting the friction disk transmission shown in Fig. 5 and for controlling the solenoids which operate the control valve shown in Figs. 8 and 9, the lever being shown in its neutral position.

Fig. 13 is a view similar to the upper part of Fig. 12 but with the control lever in an operative position.

Fig. 14 is a vertical section through the control lever as indicated by line 14—14 on Fig. 12.

Fig. 15 is a view showing the lower part of the control lever as viewed from the side opposite that shown in Fig. 12 and as indicated by the line 15—15 on Fig. 14.

Figure 1:
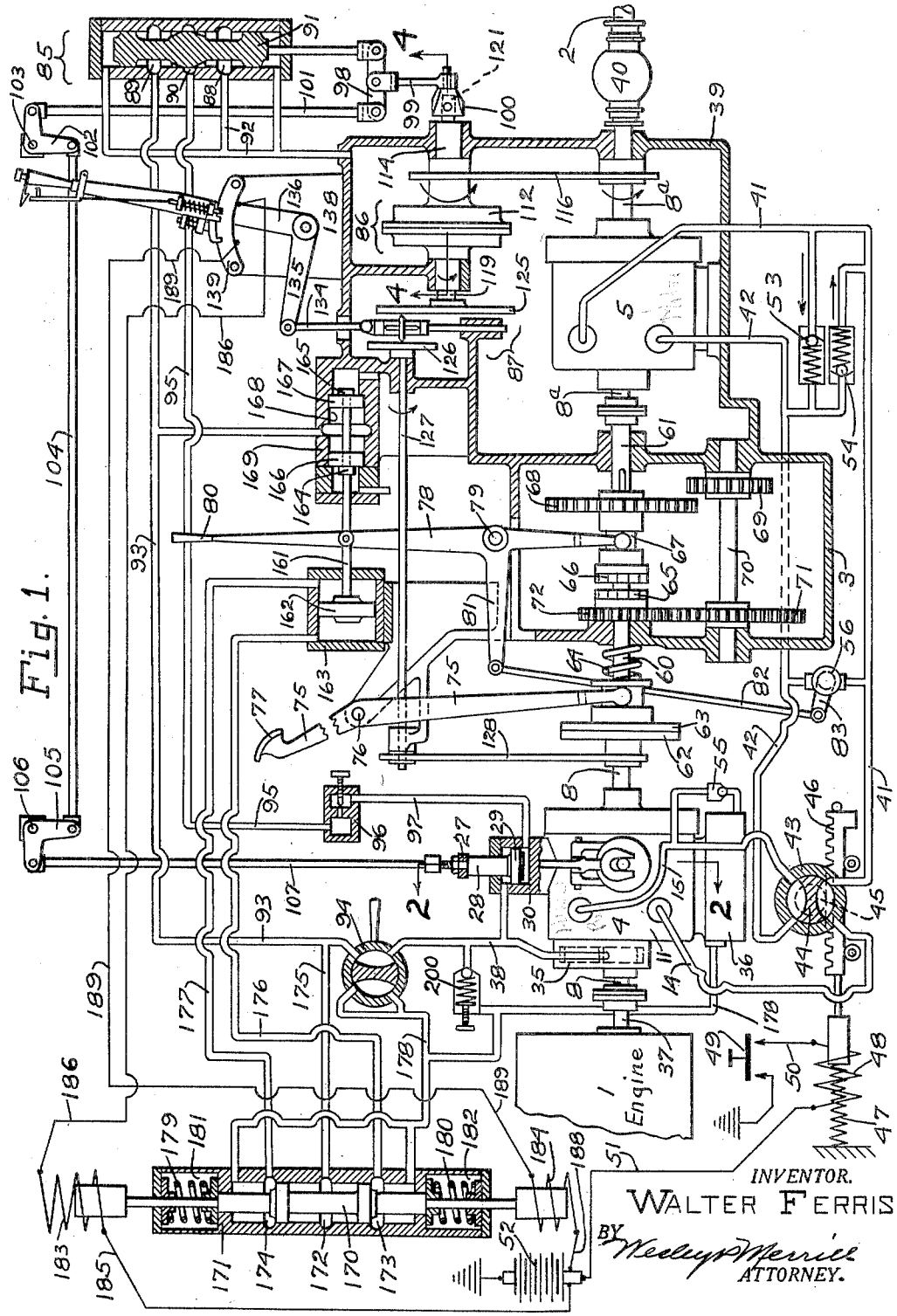
Fig. 1 is a diagrammatic view showing a drive in which the invention is embodied.

For the purpose of illustration, the invention has been shown embodied in a drive for an automotive vehicle of which, since it forms no part of the present invention, all parts have been omitted from the drawings except a part of the engine 1 which drives the vehicle and a part of the propeller shaft 2 through which motion is transmitted in the usual manner to and from the rear wheels through the usual differential not shown.

Engine 1 is adapted to drive shaft 2 either through a mechanical transmission, which is arranged in a casing 3 carried by the frame of a vehicle, or through a hydraulic transmission which consists primarily of a variable displacement pump 4 and a hydraulic motor 5.

While pump 4 and motor 5 may be of any suitable type, they have been shown as being of the vane type for the reason that it is desirable that each be small and light relative to its volumetric capacity and that the shafts thereof, the main shafts of the mechanical transmission, the shaft of engine 1 and propeller shaft 2 be arranged in axial alinement. A pump which may be employed is fully illustrated and described in Patent No. 2,141,170. Consequently, pump 4 has not been illustrated in detail and only a brief description thereof will be given herein.

Figure 2:
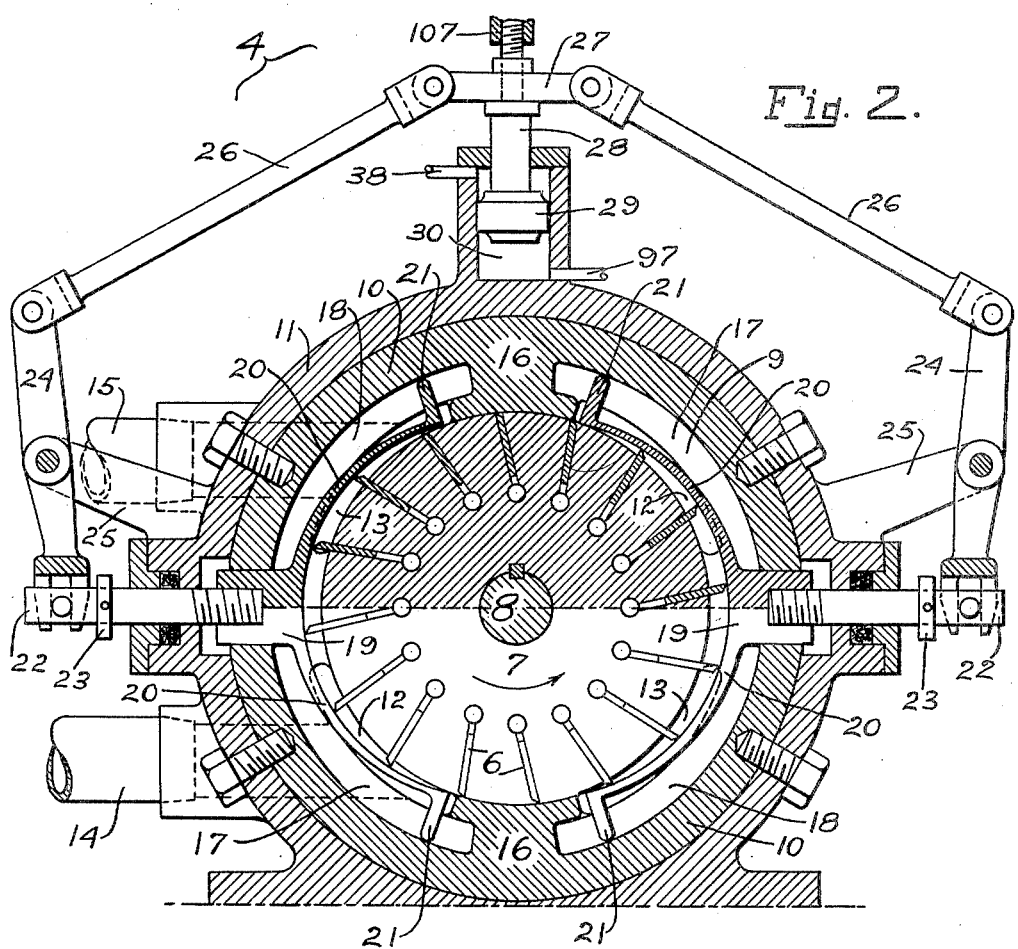
Fig. 2 is a sectional view taken on the line 2—2 of Fig. 1 and showing a pump which may be employed as a part of the hydraulic transmission, the upper part of the view being a transverse section taken through the center of the rotor and the lower part being a section taken along the face of the rotor.

Referring now more particularly to Fig. 2, pump 4 has a plurality of vanes 6 closely fitted in suitable slots which are formed in a rotor 7 and extend approximately radially inward from the periphery thereof.

Rotor 7 is fixed for rotation with a shaft 8 and closely fitted between two end plates 9 which are spaced apart by two approximately semi-circular spacer plates 10 and arranged therewith in a casing 11. Only one of the end plates 9 has been shown and that plate is provided with two diametrically opposed ports 12 and two diametrically opposed ports 13 which, when rotor 7 is rotated in the direction indicated by the arrow, function as discharge and intake ports respectively. Ports 12 and 13 are connected, respectively, through passages (not shown) to an outlet channel 14 and an intake channel 15 by means of which pump 4 is connected into an external circuit.

Each spacer plate 10 is provided with a bridge 16 which has an arcuate inner face arranged in close proximity with the periphery of rotor 7. The two bridges 16 are arranged diametrically opposite each other and divide the space between the periphery of rotor 7 and the inner peripherical surface of spacer plates 10 into two compartments each of which is divided into a discharge chamber 17 and a suction chamber 18 by the vanes engaging the arcuate inner face of an adjustable bridge 19 which is fitted between end plates 9 and between the adjacent ends of spacer plates 10 and forms a fluid tight joint therewith. Each discharge chamber 17 communicates with a discharge port 12, and each suction chamber 18 communicates with an intake port 13.

The two bridges 19 are arranged diametrically opposite each other and each is provided upon each of its upper and lower sides with a vane track section 20 which has one end thereof fixed to bridge 19 and its other end arranged in a slot formed in an end of the adjacent bridge 16, a projection 21 on the free end of each track section engaging the inner surface of spacer plate 10 to hold the inner face of the track section flush with the inner face of bridge 16. The four track sections 20 and the inner faces of bridges 16 and 19 form a continuous track upon which the outer ends of vanes 6 ride as rotor 7 rotates.

The arrangement is such that, when the inner faces of bridges 16 and 19 are equally spaced from the periphery of rotor 7, pump displacement is zero and no liquid will be discharged but, when bridges 19 are moved outward and rotor 7 is rotating in the direction indicated by the arrow, vanes 6 will transfer liquid from suction chambers 18 to discharge chambers 17 and thereby cause the pump to draw liquid through intake channel 15 and discharge it into outlet channel 14 at a rate determined by the speed of rotor 7 and the distance the inner faces of bridges 19 are spaced from rotor 7 in excess of the distance the inner faces of bridges 16 are spaced from rotor 7. Consequently, the displacement of the pump may be varied by moving bridges 19 inward or outward.

As shown, each bridge 19 has fixed thereto a rod 22 which extends outward through the wall of casing 11 and is provided on its outer part with a collar 23 for stopping its inward movement when bridge 19 reaches its zero displacement position.

Each rod 22 is connected at its outer end by means of a pin and slot connection to the lower end of a lever 24 which is pivoted intermediate its ends upon a bracket 25 carried by casing 11. The upper end of each lever 24 is connected by a link 26 to a crosshead 27 fixed upon the rod 28 of a piston 29 which is fitted in a cylinder 30 carried by casing 11.

The arrangement is such that, when liquid is supplied to the upper end of cylinder 30, piston 29 will move downward and cause bridges 19 to move inward to reduce pump displacement and, when liquid is supplied to the lower end of cylinder 30, piston 29 will move upward and cause bridges 19 to move outward to increase pump displacement.

Liquid for operating piston 29 is preferably supplied from a source which is independent of the liquid discharged by pump 4, such as a gear pump 35 (Fig. 1) which is attached to pump casing 11 and supplied with liquid from a reservoir 36 which has been shown attached to the lower part of pump casing 11.

Gear pump 35 has one of its gears fixed upon shaft 8 which is connected in any suitable manner to the shaft 37 of engine 1 so that pumps 4 and 35 are driven continuously when engine 1 is running, and pump 35 will deliver liquid regardless of whether or not pump 4 is delivering liquid.

Gear pump 35 draws liquid from reservoir 36 through a channel not shown and discharges it into a supply channel 38 one branch of which is connected to the upper end of cylinder 30 so that the upper face of piston 29 is continuously subjected to gear pump pressure as long as engine 1 continues to run. The delivery of gear pump liquid to the lower end of cylinder 30 and the operation of piston 29 is controlled by a speed responsive mechanism to be presently described.

Motor 5, which is arranged within and supported by a casing 39 connected to transmission casing 3 and supported by the frame of the vehicle, may be of a vane type similar to pump 4 but without adjustment to vary its displacement. Consequently, it is deemed sufficient to state herein that it is provided with a shaft 8a which corresponds to shaft 8 of pump 4 and which is connected at its rear end to propeller shaft 2 by any suitable means such as a universal joint 40, that shaft 8a will be rotated when motor 5 is supplied with liquid from pump 4, that the direction of rotation may be reversed by reversing the flow of liquid, and that liquid for energizing motor 5 is supplied thereto through one or the other of two channels 41 and 42 which are connected to the two ports of motor 5.

In order to reverse the flow of liquid, channels 14, 15, 41 and 42 are connected to a valve casing 43 having fitted therein a reversing valve 44 which has been diagrammatically shown as a rotary valve but which is preferably of the plunger type.

Valve 44 has been shown as having a pinion 45 fixed upon its stem and in mesh with a rack 46 which is urged in one direction by a spring 47 and adapted to be moved in the opposite direction by a solenoid 48, the movement of rack 46 in each direction being limited by suitable stops.

Solenoid 48 is controlled by a normally open switch 49 which has one of its terminals grounded, as by being connected to the frame of the vehicle, and its other terminal connected by a conductor 50 to one end of the winding of solenoid 48 the other end of which is connected by a conductor 51 to one terminal of a battery 52, the other terminal of battery 52 being grounded as by being connected to the frame of the vehicle.

The arrangement is such that, when valve 44 is in the position shown in Fig. 1, the liquid discharged by pump 4 will flow through channel 14, valve casing 43 and channel 41 to motor 5 and cause it to rotate shaft 8ª in the direction of the arrow and thereby cause the vehicle to be driven in a forward direction at a speed proportional to the displacement of pump 4 and the liquid exhausted from motor 5 will flow through channel 42, valve casing 43 and channel 15 to the intake of pump 4.

Figure 3:
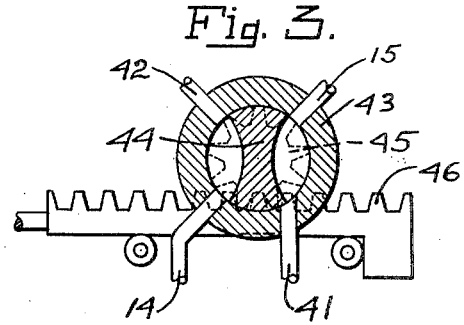
Fig. 3 is a view showing a bypass valve in a position different from that shown in Fig. 1.

When switch 49 is closed, solenoid 48 will shift valve 44 to the position shown in Fig. 3 and then the liquid discharged by pump 4 will flow through channel 14, valve casing 43 and channel 42 to motor 5 and cause it to rotate shaft 8ª in the opposite direction and thereby cause the vehicle to be reversed, and the liquid exhausted from motor 5 will flow through channel 41, valve casing 43 and channel 15 to the intake of pump 4. When switch 49 is opened, spring 47 will shift valve 44 to the position shown in Fig. 1.

In order to prevent excessive pressures from being developed in either direction of motor actuation, two oppositely opening high pressure relief valves 53 and 54 are connected between opposite sides of the circuit as by being connected between channels 41 and 42.

Since a hydraulic transmission has a certain amount of leakage or slip, means are provided for supplying additional liquid to pump 4 to compensate for such slip. As shown, channel 15 is connected to reservoir 36 through a check valve 55 which permits pump 4 to draw liquid from reservoir 36 but prevents liquid from escaping from channel 15 into reservoir 36.

The slip of a hydraulic transmission is substantially zero at zero pressure but increases as the pressure increases. Therefore, pump 4 must tend to deliver liquid to motor 5 at a rate which exceeds the requirements of motor 5 by an amount equal to the slip. When the mechanical transmission is rendered effective to drive shaft 2, the pressure in the hydraulic transmission will drop and thereby cause the slip to decrease with a resultant increase in the net delivery of pump 4 so that unless means are provided to render the hydraulic transmission ineffective to drive shaft 2 when the mechanical transmission is driving it, motor 5 would tend to drive shaft 2 at a speed in excess of the speed at which it is being driven by the mechanical transmission.

To this end, there is connected between the two sides of the hydraulic circuit, as by being connected between channels 41 and 42, a bypass valve 56 which is opened in response to the mechanical transmission being rendered effective and closed in response to the mechanical transmission being rendered ineffective as will presently be explained.

Bypass valve 56 may be large enough to bypass the entire discharge of pump 4 but, in order that the hydraulic transmission may function as a brake for decelerating the vehicle as will presently be explained, bypass valve 56 is preferably only large enough to bypass liquid at a rate which is but slightly in excess of the greatest normal slip of pump 4.

The mechanical transmission ordinarily has at least three speeds forward and one reverse, and these four speeds are selected by shifting a lever in opposite directions in two different planes. Since such transmissions are well known and in extensive use, the transmission has been shown schematically and the gears for obtaining two of the speeds have been omitted from the drawings in order to avoid complicating the view.

As shown, the mechanical transmission is provided with two shafts 60 and 61 which are journaled in transmission casing 3 in axial alignment with each other and with pump shaft 8 and motor shaft 8ª. Shaft 61 is connected at its rear end to the front end of motor shaft 8ª while shaft 60 is adapted to be driven by engine 1 through a friction clutch consisting primarily of a disk 62, which is fixed upon the rear end of pump shaft 8, and a disk 63 which is splined upon shaft 60 and urged against disk 61 by a spring 64.

Shafts 60 and 61 are adapted to be connected to each other by a jaw clutch consisting of a clutch member 65, which is fixed upon shaft 60, and a clutch member 66 which is fixed upon a sleeve 67 splined upon shaft 61.

Sleeve 67 also has a gear 68 fixed thereon and adapted to be moved into mesh with a gear 69 fixed upon a countershaft 70 which is arranged parallel to shafts 60 and 61 and journaled in the walls of casing 3. Shaft 70 has a gear 71 fixed thereon and constantly in mesh with a gear 72 which is fixed upon shaft 60.

Since pump shaft 8 is permanently connected to engine shaft 37, pump 4 will be driven and shaft 8 rotated whenever engine 1 is running. When pump 4 is adjusted to deliver liquid and sleeve 67 is in the position shown, at which time bypass valve 56 is closed and clutch 65—66 is disengaged, the liquid discharged by pump 4 will energize motor 5 and cause it to drive propeller shaft 2. When clutches 62—63, and 65—66 are engaged, at which time bypass valve 56 is open so that the hydraulic drive is ineffective, propeller shaft 2 will be driven through the mechanical transmission at a speed equal to the speed of engine 1. When clutch 62—63 is engaged and gears 68 and 69 are in mesh, at which time bypass valve 56 is open so that the hydraulic transmission is ineffective, propeller shaft 2 will be driven through the mechanical transmission at a speed having a ratio to the engine speed determined by the ratios of gear 71 and 72 and gears 68 and 69. Consequently, when one transmission is rendered effective to drive propeller shaft 2, the other transmission is automatically rendered ineffective.

Clutch 62—63 is adapted to be disengaged by a lever 75 which is pivoted intermediate its ends upon a stationary pivot 76 and has its upper end provided with a foot pedal 77 and its lower end bifurcated and arranged between suitable shoulders formed upon the hub of disk 63.

Sleeve 67 is adapted to be shifted along shaft 61, to engage or disengage clutch 65—66 and to move gear 68 into or out of mesh with gear 69, by a lever 78 which is pivoted intermediate its ends upon a stationary pivot 79 and has its upper end provided with a handle 80 and its lower end bifurcated and arranged between suitable shoulders formed upon sleeve 67.

In order that bypass valve 56 may be operated in response to movement of sleeve 67 along shaft 61, lever 78 has an arm 81 fixed thereto in alinement with pivot 79 and the outer end of arm 81 is connected by a link 82 to a lever 83 which is fixed to the stem of bypass valve 56. The arrangement is such that, when lever 78 is operated to shift sleeve 67 to its neutral position as shown, arm 81 will cause link 82 and lever 83 to close bypass valve 56 and, when lever 78 is operated to shift sleeve 67 in one direction or the other to thereby cause clutch member 66 to engage clutch member 65 or to cause gear 68 to mesh with gear 69, arm 81 will cause link 82 and lever 83 to open bypass valve 56.

In order that clutch 65—66 may be readily engaged or gear 68 readily meshed with gear 69 when the drive is in operation, motor 5 is adapted to have its speed regulated to thereby synchronize shaft 61 with shaft 60 or gear 68 with gear 69. This is accomplished by means of a control mechanism which adjusts the displacement of pump 4 to thereby regulate the speed of motor 5 in response to a variation in the relative speeds of pump 4 and motor 5.

As shown, the control mechanism includes a pilot valve 85 which controls the flow of motive liquid to and from pump control cylinder 30, a differential gear unit 86 which has one leg driven through a variable speed friction disk transmission 87 at a speed proportional to the speed of pump 4 and a second leg driven at a speed proportional to the speed of motor 5 so that its third leg rotates in response to the speed of pump 4 or the speed of motor 5 departing from a preset ratio, means for opening pilot valve 85 in response to rotation of the third leg of differential 86, and a follow-up mechanism which is operated in response to adjustment of the displacement of pump 4 and acts to close pilot valve 85 when the adjustment of pump displacement has resulted in correcting such departure from the preset ratio.

Pilot valve 85 has formed in its casing three annular grooves or ports 88, 89 and 90 communication between which is controlled by a valve member 91 which is closely fitted in the valve casing and so shaped that a slight movement thereof in one direction or the other will open port 90 to one or the other of ports 88 and 89.

Port 88 and both ends of the valve casing are connected to a drain channel 92. Port 89 is connected through a channel 93 and a shut off valve 94 to gear pump supply channel 38 so that it is constantly supplied with motive liquid when engine 1 is running and valve 94 is in the position shown in Fig. 1. Port 90 is connected through a channel 95, a choke 96 and a channel 97 to the lower end of cylinder 30.

Pilot valve member 91 has its stem connected to one end of a floating lever 98 which is connected intermediate its ends by a link 99 and a crank 100 to the third leg of differential 86 and has its other end connected to a follow-up mechanism which operates in response to adjustment of pump 4.

As shown, lever 98 is connected by a link 101 to one arm of a bell crank lever 102 which is pivoted upon a stationary pin 103. The other arm of lever 102 is connected by a link 104 to one arm of a bell crank lever 105 which is pivoted upon a stationary pin 106 and has its other arm connected by a link 107 to the rod of piston 29.

The arrangement is such that, when operation of differential 86 causes valve member 91 to be shifted downward and open port 90 to port 89 as shown in Fig. 7, liquid from gear pump 35 will flow through channel 38, valve 94, channel 93, pilot valve 85, channel 95, choke 96 and channel 97 to the lower end of cylinder 30. Since the lower face of piston 29 has a considerably greater effective pressure area than the upper face thereof due to the displacement of rod 28, the liquid entering the lower end of cylinder 30 will cause piston 29 to move upward and thereby increase the displacement of pump 4 as previously explained. When valve 91 is shifted upward to open port 90 to port 88 as shown in Fig. 6, liquid may escape from the lower end of cylinder 30 through channel 97, choke 96, channel 95 and pilot valve 85 into drain channel 92, thereby permitting liquid from gear pump 35 to flow through channel 38 to the upper end of cylinder 30 and move piston 29 downward to reduce the displacement of pump 4 as previously explained. Choke 96 will limit the rate at which liquid may flow to and from the lower end of cylinder 30 and thereby limit the rate at which the displacement of pump 4 is varied.

As soon as pilot valve member 91 starts to move in one direction, piston 29 will start to move in the opposite direction and will move link 107 with it. Link 107 will swing lever 105 upon pin 106 and cause link 104 to swing lever 102 upon pin 103 which will cause link 101 to move in the same direction that valve member 91 moves, thereby tending to swing lever 98 upon link 99 so that the follow-up mechanism tends to close valve 85 as fast as differential 86 opens it. Consequently, valve 85 is closed as soon as the third leg of differential 86 ceases to rotate.

Differential 86 is provided with a case 112 (Fig. 4) which has an internal gear 113 fixed therein and two hollow hubs 114 and 115 arranged upon opposite ends thereof and journaled in suitable bearings carried by casing 39. Hub 114 is connected by means of a suitable drive 116 to motor shaft 8ª so that differential case 86 is driven in unison with motor 5 and propeller shaft 2.

A planet pinion 117 meshes with internal gear 113 and is rotatably carried by a crank 118 fixed upon the inner end of a shaft 119 which is journaled in hub 115 and extends outward through the end thereof.

Planet pinion 117 also meshes with a sun gear 120 fixed upon the inner end of a shaft 121 which is journaled in hub 114 and has crank 100 fixed upon the outer end thereof.

Differential case 112 and shaft 119 are adapted to be driven in the same direction, as indicated by the arrows on Fig. 1. When differential case 112 and shaft 119 are driven at the same speed, shaft 121 will remain stationary and pilot valve member 91 will remain in its neutral position as shown in Fig. 1.

When the speed of differential case 112 is less than the speed of shaft 119, sun gear 120 and shaft 121 will be rotated in the same direction that case 112 is rotating, thereby causing lever 100 to be swung downward and lower pilot valve member 91 so that gear pump liquid may flow to the lower end of cylinder 30 and cause piston 29 to increase the displacement of pump 4 as previously explained. Pump 4 will then deliver liquid at an increased rate to increase the speed of motor 5 until it is driving differential case 112 at a speed equal to the speed of shaft 119.

When the speed of case 112 is greater than the speed of shaft 119, sun gear 120 and shaft 121 will be rotated in a direction opposite to that in which case 112 is rotating, thereby causing lever 100 to swing upward and raise pilot valve member 91 so that liquid may escape from the lower end of cylinder 30 and cause piston 29 to decrease the displacement of pump 4 as previously explained. Pump 4 will then deliver liquid at a decreased rate and cause the speed of motor 5 to be decreased until it is driving differential case 112 at a speed equal to the speed of shaft 119.

As previously explained, shaft 119 is adapted to be driven through friction disk transmission 87. As best shown in Fig. 5, transmission 87 has a driven disk 125 fixed upon the outer end of shaft 119, a driving disk 126 fixed upon a shaft 127 which is rotatably supported by the frame of the vehicle and connected by a suitable drive 128 to pump shaft 8 so that disk 126 is driven at a speed proportional to the speed of shaft 8, and a transfer disk 129 for transmitting motion from disk 126 to disk 125.

When transfer disk 129 engages driving disk 126 at the center thereof, it will not be rotated and motion will not be transmitted thereby to driven disk 125. When disk 129 is moved downward so that it engages disk 126 at a point spaced from the center thereof as shown in Fig. 5, it will be rotated by disk 126 and cause disk 125 to rotate. The speed of disk 125 relative to the speed of disk 126 is determined by the distance that disk 129 is spaced from the center of disk 126.

Transfer disk 129 has been shown as being fixed upon a shaft 130 which is pivoted between suitable shoulders formed upon a slide 131 having a rod 132 fixed thereto and fitted in a guide 133 carried by casing 39.

Slide 131 (Fig. 5) is connected by link 134 to an arm 135 (Figs. 1 and 12) forming a part of control lever 136 which is provided at its upper end with a handle 137 and is pivoted at its lower end upon a bracket 138 carried by casing 39. It will be obvious that movement of lever 136 in one direction or the other will cause transfer disk 129 to be raised or lowered and thereby vary the speed of disk 125 relative to the speed of disk 126.

In order that lever 136 may be retained in any position, bracket 138 is provided with a quadrant 139 consisting primarily of two spaced apart side members having arcuate upper faces, and lever 136 extends between the side members and is provided with a friction shoe 140 which is urged against the upper face of quadrant 139 by a spring 141. Shoe 140 has a stem 142 formed thereon and fitted in two guides 143 and 144 carried by lever 136, and spring 141 encircles stem 142 between guide 143 and a suitable collar carried by stem 142.

In order that lever 136 may be retained in any one of a plurality of selective positions, it is provided with a latch to engage any one of a plurality of notches formed in quadrant 139.

As shown, quadrant 139 has three notches 150, 151 and 152 formed therein and adapted to be engaged by a latch 153 which is slidable through two guides 154 and 155 carried by lever 136. Latch 153 is urged toward quadrant 139 by a spring 156 arranged between guide 154 and a suitable collar fixed upon latch 153.

Notches 150, 151 and 152 are so located that, when latch 153 is in notch 150, lever 136 will hold transfer disk 129 in contact with the center of disk 126 in which position of transfer disk 129 no motion is transmitted from shaft 8 to differential 86 so that the displacement of pump 4 will be zero and motor 5 will not be energized.

When lever 136 is advanced until latch 153 engages notch 151, disk 129 will move downward as shown in Fig. 5 and enable disk 126 to drive disk 125 at the proper speed to cause the displacement of pump 4 to be so adjusted that it will deliver just sufficient liquid to cause motor 5 to rotate shafts $8^a$ and 61 at such a speed ratio that the peripheral speed of gear 68 is equal to the peripheral speed of gear 69 so that gear 68 may readily mesh with gear 69.

When lever 136 is advanced until latch 153 engages notch 152, disk 129 will be moved farther from the center of disk 126 so that it is driven at a higher speed and drives disk 125 at the proper speed to cause the displacement of pump 4 to be so adjusted that it will deliver just sufficient liquid to cause motor 5 to synchronize shafts $8^a$ and 61 with shaft 60 so that clutch 65—66 may be readily engaged.

In order that latch 153 may be retracted out of contact with quadrant 139, a bell crank hand grip 157 is connected at its rear end by a pin 158 to lever 136 just below handle 137 and connected at the junction of its two arms by a link 159 to the upper end of latch 153 so that, when the operator grasps handle 137, he may draw the vertical arm of hand grip 157 toward handle 137 and thereby cause hand grip 157 to swing upon pin 158 and raise latch 153.

In order that latch 153 may be held out of contact with quadrant 139, a spring catch 160 is arranged upon the end of handle 137 and adapted to lock the upper end of hand grip 157 when latch 153 is fully retracted, thereby preventing latch 153 from being moved downward by spring 156 when hand grip 157 is released by the operator. To release latch 153, the operator simply raises the end of latch 160 when he grasps handle 137 to shift lever 136.

When latch 153 is held out of contact with quadrant 139, lever 136 is held in any adjusted position by friction shoe 140 engaging the face of quadrant 139. The purpose of latch 153 is to positively fix lever 136 in such a position that disk 129 will either be in its neutral position or be in a position to either cause shaft 61 to be synchronized with shaft 60 or to synchronize gear 68 with gear 69 so that clutch 65—66 may be readily engaged or gear 68 readily meshed with gear 69 as previously explained.

Clutch 65—66 may be engaged and gear 68 may be meshed with gear 69 either automatically or by manual operation of gear shift lever 78. As shown in Fig. 1, lever 78 is pivoted intermediate its ends to a rod 161 intermediate the ends thereof. Rod 161 has one of its ends connected to a piston 162 which is fitted in a stationary cylinder 163 and forms therewith a servo-motor for operating lever 78.

The other end portion of rod 161 has two collars 164 and 165 fixed thereon and two pistons 166 and 167 closely fitted to slide thereon between collars 164 and 165. Pistons 166 and 167 are closely fitted in the bore 168 of a stationary cylinder 169 and form therewith a servo-motor for moving lever 78 to its neutral position.

The effective pressure areas of pistons 166 and 167 are considerably smaller than the area of piston 162 so that, when liquid is delivered to cylinders 163 and 169 at the same pressure, servo-motor 162—163 is able to shift lever 78 against the resistance of servo-motor 166—169.

The distance between the ends of bore 168 is the same as the distance between the adjacent faces of collars 164 and 165 and bore 168 is ordinarily supplied through channel 93 with gear pump liquid at all times so that, when servo-motor 162—163 is not energized, the pressure in bore 168 will move pistons 166 and 167 against the ends of bore 168 and one of the pistons will engage one of the collars on rod 161 and shift lever 78 to its neutral position.

Liquid for operating servo-motor 162—163 is supplied thereto under the control of a valve 170 which is fitted in the bore of a valve casing 171 having three annular grooves or ports 172, 173 and 174 formed therein.

Port 172 is connected to gear pump supply channel 93 by a channel 175, port 173 is connected to one end of cylinder 163 by a channel 176, port 174 is connected to the other end of cylinder 163 by a channel 177, and the bore in cylinder 171 has both ends thereof connected to a drain channel 178 which discharges into reservoir 36 and is also connected to shut-off valve 94.

Valve 170 is urged toward its central or neutral position as shown in Fig. 1 by two caged springs 179 and 180 arranged, respectively, in two spring chambers 181 and 182 which are formed in or arranged upon opposite ends of valve casing 171. Valve 170 is adapted to be shifted in one direction or the other by two solenoids 183 and 184 which are arranged at opposite ends of valve casing 171 and have the cores thereof connected, respectively, to opposite ends of valve 170 by suitable stems which extend through spring chambers 181 and 182.

Solenoids 183 and 184 are controlled by switches carried by the control lever mechanism. As shown, solenoid 183 has one end of its winding connected by a conductor 185 to the ungrounded terminal of battery 52 and the other end of its winding connected by conductor 186 to a spring contact 187 (Fig. 15) carried by a quadrant 139. Solenoid 184 (Fig. 1) has one end of its winding connected by conductor 188 to the ungrounded terminal of battery 52 and the other end of its winding connected by conductor 189 to a spring contact 190 (Fig. 15) carried by quadrant 139.

Spring contacts 187 and 190 are insulated from quadrant 139 and are arranged upon opposite sides of a double spring contact 191 which is grounded to the frame of the vehicle. Contacts 187, 190 and 191 are arranged below the upper flange of quadrant 139 which has suitable openings formed therein to permit the passage therethrough of a bridging contact 192 which is slidable through a guide 193 carried by lever 136.

The several contacts are so located that, when latch 153 (Fig. 12) is in position to engage notch 151, contact 192 will be in position to bridge contacts 187 and 191 and, when latch 153 is in position to engage notch 152, contact 192 will be in position to bridge contacts 190 and 191.

When contact 192 bridges contacts 187 and 191, a circuit will be established from battery 52 through conductor 185, the winding of solenoid 183, conductor 186, contacts 187, 192 and 191 and the vehicle frame to battery 52, thereby energizing solenoid 183 which will shift valve 170 to the position shown in Fig. 8 so that liquid from gear pump 35 may flow through channel 38, valve 94, channel 175, valve casing 171 and channel 177 to the right end of cylinder 163 and, as shown in Fig. 10, cause piston 162 to shift lever 78 in a direction to move gear 68 into mesh with gear 69.

When contact 192 bridges contacts 190 and 191, a circuit will be established from battery 52 through conductor 188, the winding of solenoid 184, conductor 189, contacts 190, 192 and 191 and the vehicle frame to battery 52, thereby energizing solenoid 184 which will shift valve 170 to the position shown in Fig. 9 so that liquid from gear pump 35 may flow through channel 38, valve 94, channel 175, valve casing 171 and channel 176 to the left end of cylinder 163 and, as shown in Fig. 11, cause piston 162 to shift lever 78 in a direction to move clutch member 66 into engagement with clutch member 65.

Bridging contact 192 (Figs. 14 and 15) is fixed upon the end of a rod 194 which extends upward through lever 136 and is provided at its upper end with a button 195 (Fig. 12) by means of which it may be depressed to move contact 192 into engagement with the spring contacts.

Rod 194 is urged upward by a spring 196 which is arranged within handle 137 and engaging an abutment 197 formed upon rod 194 near the upper end thereof. Abutment 197 is engaged by a leaf spring 198 which is fixed to handle 137 and adapted, when button 195 is fully depressed, to move abutment 197 toward the front of handle 137 and cause its upper end to catch beneath the upper end of handle 137 as shown in Fig. 13, thereby holding contact 192 in engagement with the spring contacts.

In order that bridging contact 192 may be retracted before lever 136 can be shifted, hand grip 157 is provided near its upper end with a lug 199 which engages abutment 197 and moves it out of engagement with the upper wall of handle 137 when hand grip 157 is operated to withdraw latch 153 from one of the notches in quadrant 139.

Operation

Assuming that the several parts are in the positions shown in Fig. 1, that the vehicle is stationary, that the displacement of pump 4 is zero and that engine 1 is running, the drive will operate as follows:

Shafts 8, 60, 70 and 127 will be rotated and pumps 4 and 35 will be driven by engine 1. Neither shaft 60 nor shaft 70 can transmit motion to shaft 61 as clutch 65—66 is disengaged and gear 68 is out of mesh with gear 69. Shaft 127 cannot transmit motion to differential 86 as disk 129 is in contact with disk 126 at the center thereof. Pump 4 cannot energize motor 5 as its displacement is zero. Pump 35 will discharge through its relief valve 200 which will enable it to maintain a predetermined pressure in channels 38 and 93 and cause servo-motor 164—169 to hold gear shift lever 78 in its neutral position.

If the operator wishes to use only the mechanical transmission, he turns the handle of valve 94 through 90° to connect channels 38 and 93 to drain channel 178, thereby by-passing pump 35 and connecting servo-motor 164—169 to drain so that lever 78 may be readily shifted to employ the mechanical transmission in the usual manner, clutch 62—63 being disengaged when gears are to be meshed or when clutch 65—66 is to be engaged.

If the hydraulic transmission is to be used, valve 94 is adjusted as shown. To start the machine, the operator advances control lever 136 from its neutral position, thereby moving disk 129 below the center of disk 126. Since disk 126 is rotating, it will cause disk 129 to rotate disk 125 and, since differential case 112 is stationary, rotating disk 125 will cause pilot valve member 91 to move downward and direct liquid to the lower end of control cylinder 30, thereby causing piston 29 to increase the displacement of pump 4 from zero so that pump 4 will start to deliver liquid to motor 5 which will start to rotate propeller shaft 2 and differential case 112 all as previously explained.

Rotation of differential case 112 will tend to move pilot valve member 91 to its neutral position but the displacement of pump 4 will continue to increase until motor 5 is driving shaft 2 at a speed which is determined relative to the speed of engine 1 by the distance that disk 129 is offset from the center of disk 126 at which time the speed of differential case 112 will equal the speed of disk 125 and pilot valve member 91 will be in its neutral position so that further adjustment of pump 4 will cease.

When the speed of shaft 2 varies relative to the speed of engine 1 due either to the speed of engine 1 being varied or to a variation in the load on shaft 2, disk 125 and differential case 126 will rotate at different speeds and thereby cause pilot valve member 91 to be shifted and direct liquid to or from the lower end of cylinder 30 so that piston 29 will vary the displacement of pump 4 until motor 5 is driving propeller shaft 2 at the speed determined by the speed of engine 1 and the position of disk 129.

The speed of shaft 2 relative to the speed of engine 1 may be steplessly varied between zero and full speed by simply shifting control lever 36 so that the vehicle may be readily started and easily handled in traffic.

When the operator has shifted lever 136 until latch 153 (Fig. 12) is in alinement with notch 151 or notch 152, he may raise catch 160 to release hand grip 157 and permit spring 156 to advance latch 153 into the notch with which it is in alinement. After waiting an instant to give the speed control mechanism time to cause clutch member 65 to synchronize with clutch member 66 or gear 68 to synchronize with gear 69 as previously explained, he may depress button 195.

If latch 153 is in alinement with notch 151, depressing button 195 will cause contact 192 to bridge contacts 187 and 191 and establish a circuit through solenoid 183 which will then shift valve 170 to the position shown in Fig. 8 so that gear pump liquid may flow to the right end of cylinder 163 and cause piston 162 to shift lever 78 in a direction to mesh gear 68 with gear 69.

If latch 153 is in alinement with notch 152, depressing button 195 will cause contact 192 to bridge contacts 190 and 191 and establish a circuit through solenoid 184 which will then shift valve 170 to the position shown in Fig. 9 so that gear pump liquid may flow to the left end of cylinder 163 and cause piston 162 to shift lever 78 in a direction to engage clutch member 66 with clutch member 65.

Shifting lever 78 causes by-pass valve 56 to open and by-pass at least a part of the liquid discharged by pump 4 so that, as soon as clutch 65—66 is engaged or gear 68 is in mesh with gear 69, the hydraulic transmission is rendered ineffective and the vehicle is driven solely through the mechanical transmission.

If the operator wishes to change to a different gear ratio or to control the vehicle hydraulically, he presses hand grip 157 toward handle 137 to raise latch 153 out of engagement with quadrant 139. Lug 199 on hand grip 157 will move abutment 197 from underneath the top wall of handle 137 and permit spring 196 to retract the bridging contact from between the spring contacts so that solenoid 183 or 184 is deenergized and permits valve 170 to return to its neutral position and open both ends of cylinder 163 to drain so that servo-motor 164—169 can shift lever 78 to put the mechanical transmission in neutral. The vehicle is then being driven through the hydraulic transmission which may be adjusted as explained above.

Since bypass valve 56 is opened when lever 78 is operated to connect shaft 61 to shaft 60 either directly or through intermediate gears and since valve 56 is closed when lever 78 is operated to disconnect shaft 61 from shaft 60, engine 1 is always connected to propeller shaft 2 through one or the other of the two transmissions but never through both.

The invention herein set forth is susceptible of various modifications and adaptations without departing from the scope thereof as hereafter claimed.

The invention is hereby claimed as follows:

1. The combination, with a shaft and an engine for driving said shaft, of a mechanical transmission having one part thereof connected to said shaft to drive the same and another part connected to and driven by said engine, a hydraulic transmission including a pump driven by said engine and a motor energized by said pump for driving said shaft, means for adjusting said mechanical transmission to connect the two parts thereof and thereby render said mechanical transmission effective to drive said shaft, means operated in unison with said adjusting means for rendering said hydraulic transmission ineffective to drive said shaft when the two parts of said mechanical transmission are connected, and other means for reversing said hydraulic motor.

2. The combination, with a shaft and an engine for driving said shaft, of a mechanical transmission having one part thereof connected to said shaft to drive the same and another part connected to and driven by said engine, a hydraulic transmission including a pump driven by said engine and a motor energized by said pump for driving said shaft, means for adjusting said mechanical transmission to connect the two parts thereof and thereby render said mechanical transmission effective to drive said shaft, a valve for bypassing at least a part of the liquid discharged by said pump, and means for operating said valve and said adjusting means simultaneously.

3. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby permit the speeds of the two parts of said mechanical transmission to be synchronized, and means for connecting the two parts of said mechanical transmission to each other.

4. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby permit the speeds of the two parts of said mechanical transmission to be synchronized, means for connecting the two parts of said mechanical transmission to each other, and means operable in unison with said connecting means for rendering said hydraulic transmission ineffective to drive said shaft when the two parts of said hydraulic transmission are connected.

5. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby permit the speeds of the two parts of said mechanical transmission to be synchronized, power means for connecting the two parts of said mechanical transmission to each other, and means operable only when said adjusting means is in a predetermined position for effecting operation of said power means.

6. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby permit the speeds of the two parts of said mechanical transmission to be synchronized, means for connecting the two parts of said mechanical transmission to each other, and means for reversing said motor.

7. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, means responsive to a variation in the relative speeds of said shaft and said engine for operating said displacement varying means to thereby cause said motor to drive said shaft at a speed proportional to the speed of said engine, means for adjusting said speed responsive means to regulate the speed of said shaft relative to the speed of said engine and thereby permit the speeds of the two parts of said mechanical transmission to be synchronized, means for adjusting said mechanical transmission to connect and disconnect the two parts thereof, a valve for bypassing at least a part of the liquid discharged by said pump, and means for operating said adjusting means and said bypass valve simultaneously.

8. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, a three legged differential having one leg rotated by said engine and a second leg rotated by said shaft whereby the third leg will rotate in response to a variation in the relative speeds of said engine and said shaft, a hydraulic servo-motor for operating said displacement varying means, means for supplying liquid to said servo-motor including a pilot valve for controlling the delivery of liquid thereto and operated in response to rotation of the third leg of said differential, a follow-up mechanism for transmitting motion from said displacement varying means to said pilot valve, and means for simultaneously rendering one transmission effective and the other transmission ineffective to drive said shaft.

9. The combination, with a shaft and an engine for driving said shaft, of a mechanical transmission having one part thereof connected to and driven by said engine and a second part connected to and rotatable with said shaft and adapted to be connected to said first part to thereby enable said engine to drive said shaft through said transmission, a hydraulic transmission including a pump driven by said engine and a hydraulic motor connected to said shaft and energized by liquid supplied to it by said pump to enable it to drive said shaft, means for varying the displacement of said pump to thereby vary the speeds of said motor and said shaft relative to the speed of said engine, a three legged differential having one leg rotated by said engine and a second leg rotated by said shaft whereby the third leg will rotate in response to a variation in the relative speeds of said engine and said shaft, a hydraulic servo-motor for operating said displacement varying means, means for supplying liquid to said servo-motor including a pilot valve for controlling the delivery of liquid thereto and operated in response to rotation of the third leg of said differential, a follow-up mechanism for transmitting motion from said displacement varying means to said pilot valve, means for adjusting said mechanical transmission to connect and disconnect the two parts thereof, a valve for bypassing at least a part of the liquid discharged by said pump, and means for operating said adjusting means and said bypass valve simultaneously.

10. The combination, with a first shaft, a second shaft and an engine connected to said first shaft to drive the same, of a variable speed mechanical transmission connected to said shafts and including a plurality of gear trains selectively engageable to enable said transmission to drive said second shaft from said first shaft at any one of a plurality of definite speed ratios and disengageable to render said transmission ineffective to drive said second shaft, means for adjusting said transmission to engage or disengage said gear trains, a hydraulic transmission for driving said second shaft from said first shaft including means for adjusting it to vary the speed ratios of said shafts through a stepless range, a control transmission including a ratio adjuster driven from one of said shafts and a three legged differential having one leg driven from that shaft through said adjuster and a second leg driven from the other shaft whereby its third leg will rotate in response to adjustment of said adjuster or to a variation in the relative speeds of said shafts, means for operating said hydraulic transmission adjusting means in response to rotation of the third leg of said differential to thereby correct a variation in the speed of said second shaft or to vary the speed of said second shaft in response to adjustment of said ratio adjuster, means for adjusting said ratio adjuster to thereby vary the speed of said second shaft relative to the speed of said first shaft, and means responsive to engagement of said gear trains for rendering said hydraulic transmission ineffective to drive said second shaft and responsive to disengagement of said gear trains for rendering said hydraulic transmission effective to drive said second shaft.

11. The combination, with a first shaft, a second shaft and an engine connected to said first shaft to drive the same, of a variable speed mechanical transmission connected to said shafts and including a plurality of gear trains selectively engageable to enable said transmission to drive said second shaft from said first shaft at any one of a plurality of definite speed ratios and disengageable to render said transmission ineffective to drive said second shaft, means for adjusting said transmission to engage or disengage said gear trains, a hydraulic transmission for driving said second shaft from said first shaft including means for adjusting it to vary the speed ratios of said shafts through a stepless range, a control transmission including a ratio adjuster driven from one of said shafts and a three legged differential having one leg driven from that shaft through said adjuster and a second leg driven from the other shaft whereby its third leg will rotate in response to adjustment of said adjuster or to a variation in the relative speeds of said shafts, means for operating said hydraulic transmission adjusting means in response to rotation of the third leg of said differential to thereby correct a variation in the speed of said second shaft or to vary the speed of said second shaft in response to adjustment of said ratio adjuster, means for adjusting said ratio adjuster to thereby vary the speed of said second shaft relative to the speed of said first shaft, means for locating said ratio adjuster adjusting means in a position in which the ratio of said control transmission is such that said hydraulic transmission is caused to drive said second shaft at such a speed that the speed ratio of said shafts is identical to a speed ratio of said mechanical transmission, and power means operable only when said adjuster adjusting means is in said position for operating said mechanical transmission adjusting means.

12. The combination, with a first shaft, a second shaft and an engine connected to said first shaft to drive the same, of a variable speed mechanical transmission connected to said shafts and including a plurality of gear trains selectively engageable to enable said transmission to drive said second shaft from said first shaft at any one of a plurality of definite speed ratios and disengageable to render said transmission ineffective to drive said second shaft, means for adjusting said transmission to engage or disengage said gear trains, a hydraulic transmission for driving said second shaft from said first shaft including means for adjusting it to vary the speed ratios of said shafts through a stepless range, a control transmission including a ratio adjuster driven from one of said shafts and a three legged differential having one leg driven from that shaft through said adjuster and a second leg driven from the other shaft whereby its third leg will rotate in response to adjustment of said adjuster or to a variation in the relative speeds of said shafts, means for operating said hydraulic transmission adjusting means in response to rotation of the third leg of said differential to thereby correct a variation in the speed of said second shaft or to vary the speed of said second shaft in response to adjustment of said ratio adjuster, means for adjusting said ratio adjuster to thereby vary the speed of said second shaft relative to the speed of said first shaft, means for locating said ratio adjuster adjusting means in a position in which the ratio of said control transmission is such that said hydraulic transmission is caused to drive said second shaft at such a speed that the speed ratio of said shafts is identical to a speed ratio of said mechanical transmission, power means operable only when said adjuster adjusting means is in said position for operating said mechanical transmission adjusting means, and means responsive to engagement of said gear trains for rendering said hydraulic transmission ineffective to drive said second shaft and responsive to disengagement of said gear trains for rendiring said hydraulic transmission effective to drive said second shaft.

WALTER FERRIS.